Patented June 15, 1937

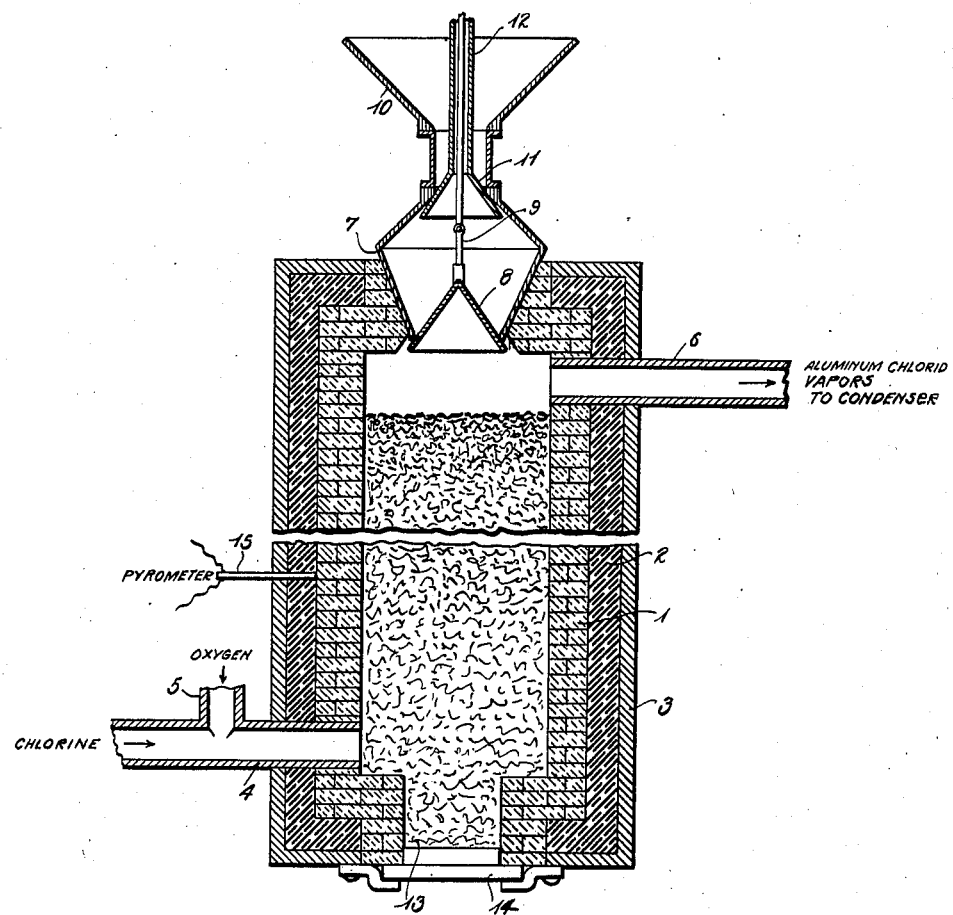

2,084,289

UNITED STATES PATENT OFFICE 2,084,289

PROCESS OF MAKING ALUMINUM CHLORIDE

Almer McDuffie McAfee and Joseph A. Tryon, Port Arthur, Tex., assignors, by mesne assignments, to Gulf Oil Corporation, Pittsburgh, Pa., a corporation of Pennsylvania Application September 17, 1926, Serial No. 136,099
Renewed November 9, 1936

10 Claims. (Cl. 23—95)

This invention relates to processes of making aluminum chloride; and it comprises treating a pervious charge of a mixture of alumina, such as bauxite, and carbon, with chlorine and oxygen simultaneously introduced, under conditions whereby the heat of reaction is retained; all as more fully hereinafter set forth and as claimed.

Anhydrous aluminum chloride is now extensively used in the arts, and particularly in the petroleum oil industry for purifying and converting oils. It has been manufactured in a variety of ways involving complicated and expensive methods of preparing the materials for treatment and steps in the treating processes requiring much apparatus, excessive labor and considerable time.

The reactions utilized in the manufacture of aluminum chloride take place at a rather high temperature plane and the materials used must be brought to and maintained at this temperature by a supply of heat in some way. In view of the reactivity of carbon and of chlorine upon ordinary structural materials at high temperatures, the supply of heat and maintenance of temperature have presented many practical difficulties in the art. Propositions looking to their solution have been many. It has been proposed to make aluminum chloride from hot bauxite and carbon by the use of chlorine alone, by chlorine and producer gas, by processes involving preheating the solid reaction materials as well as by preheating the gases used in the process, and by a process of intermittently blowing the charge with air to restore heat. It has also been proposed to selectively produce iron chloride, aluminum chloride and silicon tetrachloride by a process using air and a stagewise increase of temperatures to separately produce the different chlorides.

In the manufacture of aluminum chloride by introduction of air or producer gas along with the chlorine difficulties have been encountered in maintaining temperature and incident to the increased volume of gases to be handled. The chlorine is too dilute and it is hard to secure complete condensation of aluminum chloride. In one of the current and successful methods of making aluminum chloride, bauxite is calcined and then mixed in certan definite proportions with coal, treated with a binding material and formed into briquets which after carbonization to drive off volatils are charged into a chlorinating apparatus. Chlorine is passed over such briquets. On the large scale, reaction is often not complete and large amounts of residue result. The apparatus must be freed of these residues and fines from time to time and during the removal much time and material are lost and much labor is necessary.

We have discovered that we can overcome the disadvantages above pointed out, can maintain temperatures within a definite range, can use smaller apparatus and condensers, can readily condense all produced aluminum chloride, can eliminate formation of residues which have to be removed, can eliminate the necessity of specially preparing the charge materials and can save much labor, time and expense in the handling of the materials and in the operation by using a mixture of chlorine and oxygen. Technically produced oxygen is rarely free of other gases and sometimes the amount of these gases is substantial. The greater the concentration of the oxygen used, the better. The mixture of chlorine and oxygen is passed into and through a pervious charge of bauxite and carbon occurring together in a suitable converter but not necessarily intimately admixed. It is in fact better to have some proportion of coarse or lump bauxite to maintain permeability of the charge.

In using our process we dehydrate or calcine the bauxite; the heated bauxite being used as it comes from the calciner or the kiln. Ordinarily the bauxite supplied to the calciner is "run-of-mine" material. This may be roughly mixed with carbon in the form of coke, such as petroleum breeze or relatively shallow layers of such bauxite and of such carbon may be alternately charged into the converter. As the converter, an apparatus of the general type of an upblast gas producer may be used. When any form of carbon containing volatils is used, it is best to heat and carbonize it prior to use in the present process to free it of such volatils. Any hydrocarbons in the coke result in a useless consumption of the chorine to form HCl. The carbon may be mixed with the bauxite before dehydration of the latter so that the two can be heated together. The converter is charged with calcined bauxite and with coke direct from the heating means, without allowing cooling. This furnishes the necessary heat in starting up a new retort. Chlorine and oxygen are led into the converter, best at a point near the bottom of the converter. The proportion of oxygen to chlorine is so regulated and calculated upon the charge of alumina material and of carbon as to completely convert all oxides of the charge into chlorides with production of $CO_2$. In using good commercial bauxite there is a yield of 85 to 90 per cent aluminum chloride.

The remainder is iron chloride, which is condensed with the aluminum chloride, and silicon tetrachloride and titanium tetrachloride which are produced simultaneously with the aluminum chloride and which pass through and beyond the aluminum chloride condenser, being very volatile materials. They may be recovered or sent to waste as economic conditions may dictate. There is very little of effluent gases other than $CO_2$ coming from the converter. Substantially no solid residues are left in the retort. Condensation of the aluminum chloride vapor is easy and efficient because of its relatively high concentration in the gases leaving the converter. The operation of the apparatus making the chloride does not have to be interrupted from time to time to remove ash, residue or fines, or for the purpose of restoring heat, as by blowing with air. Since there is no necessity for interruptions for the purposes stated, the process is continuous. Chlorine and oxygen, preferably premixed, are led continuously into the charge and the resultant vapors of aluminum chloride are continuously condensed. As the depth of the charge in the converter decreases, additional bauxite and carbon are introduced. The bauxite and carbon may be used as they come from the heating apparatus at a temperature usually of 1400° F.–1800° F. This introduction may be made continuous by the use of charging apparatus adapted to prevent leakage of aluminum chloride vapors; or the charging may be intermittent. With intermittent charging, replenishment should be when about a third of the charge disappears. The charge material may be delivered to the converter by any of the usual types of sealing and feeding means used in gas producers. The total of the reaction involved is exothermic, temperatures around 1600° to 1800° being readily established and maintained. It is desirable for many reasons that the converter be lagged or otherwise insulated against passage of heat.

One of the main advantages of the process is that the charging material need not necessarily be specially prepared for the reaction, save insofar as is necessary in removing volatils (water and hydrocarbons) which would waste chlorine. Intermingled lumps of bauxite and carbon may be used in the correct proportions; or, as stated, alternate shallow layers of each may be charged. While it is better to supply the bauxite and carbon hot, this is not necessary since the reaction is sufficiently exothermic to take care of cold charged materials. Cold materials however are apt to contain moisture.

Another valuable feature of the present invention is the ability to gauge the carbon, using substantially that amount requisite to furnish $CO_2$ with the oxygen delivered to the charge and the oxygen of the oxides in the bauxite. Any amount of carbon over this forms CO at the expense of the $CO_2$ in the reaction vessel, thereby uselessly consuming a great amount of heat and further impeding condensation by adding to the volume of gases going through the condenser.

The oxygen is advantageously not less than 75 per cent purity. The oxygen supplied by commercial air-liquefying processes is around 99 per cent purity and is particularly well adapted for the present purposes because of its high concentration. Approximately one-third by volume of oxygen and two thirds by volume of chlorine are the best proportions. The exact proportions, however, as well as the best proportions of carbon to bauxite, vary somewhat with the composition of the bauxite used. Only enough carbon should be present to take care of all the free oxygen and of the combined oxygen of the oxides of the bauxite, with production of $CO_2$. With the South American grade of bauxite a mixture of 74 per cent bauxite and 26 percent petroleum coke is correct.

Petroleum coke is the best form of carbon for the present purpose because of its comparative freedom from ash. Ordinary coke, charcoal and other forms of carbon may be used but they cause a waste of chlorine in chlorinating ash constituents. Petroleum coke breeze is a suitable material and is relatively cheap. Whatever form of carbon is used, it should be free of volatils and moisture.

In the accompanying illustration showing one form of apparatus useful in the performance of our process, the figure in the drawing shows a vertical central section through a converting apparatus.

Reference numeral 1 indicates fire-brick or clay or other refractory material built up to form a chamber which is, as shown, advantageously, of cylindical shape. Completely surrounding the fire-brick is a heavy lagging 2 of heat insulating material, such as diatomaceous silica (sil-o-cel) or the like, and surrounding this is a steel or iron shell 3. At the lower end of the apparatus is provided a gas inlet 4 leading from a source of chlorine (not shown) and in communication with such inlet is an inlet 5 leading from a source of oxygen (not shown). At the top of the apparatus is a vapor outlet 6 in communication with an aluminum chloride condenser (not shown). At the top of the apparatus is provided a hopper 7 and bell 8, controlled through operating handle 9 by means of which a charge of carbon and calcined bauxite can be delivered to the apparatus. In order that the charge may be delivered while preventing escape of aluminum chloride vapors the double hopper device shown may be used. On top of the hopper 7 is mounted a second hopper 10 having the bell 11 operated by handle 12 through which the handle 9 extends. Through this arrangement the charge can be dumped first from hopper 10 into hopper 7 and after hopper 10 is sealed the bell 8 of hopper 7 may be lowered to deliver the charge to the converter. At the bottom of the converter is provided a relatively large opening 13 with removable cover 14 to allow the apparatus to be opened for cleaning or repairs. Pyrometer 15 is provided for following the temperature range.

In carrying out the process in the apparatus illustrated and described, bauxite which has been calcined, in admixture with petroleum breeze, or alternate layers of calcined bauxite and of petroleum breeze, free of moisture and volatiles, are charged hot into the converter through the hopper 7. The hopper 7 is then closed by means of the bell 8 and chlorine and oxygen are led through inlet 4 to the converter under pressure sufficient to force the mixture through the pervious mass of bauxite and carbon. As before stated, the proportion of oxygen to chlorine is regulated and calculated upon the charge so as to completely convert all oxides of the charge into chlorides with production of $CO_2$. With calcined South American bauxite and with petroleum breeze which is free of volatiles and moisture, in the proportion by weight of 74 per cent bauxite and 26 per cent petroleum breeze, we have found that approximately one-third by volume of oxygen and two-thirds by volume of chlorine are the best proportions.

Under the conditions stated, temperatures of from 1600° to 1800° F. are established and these temperatures are maintained by the actions taking place. The provision of the heat insulation around the converter is however useful. The pyrometer 15 indicates the temperature. Should the temperature decrease or increase for any reason it is best to adjust it to around 1600° to 1800° by temporarily increasing the amount of oxygen or the chlorine, as the case may be.

Bauxite contains oxides of iron, silicon and titanium as well as aluminum and to the extent that these materials are present they are, in a sense, impurities. Chlorides of all these elements are produced. The vapors of the chlorides leaving the outlet 6 pass the condenser (not shown) connected therewith and aluminum chloride and ferric chloride are condensed. Silicon tetrachloride and titanium tetrachloride which pass the condenser may be recovered or sent to waste. Under the best conditions the effluent gases, aside from the presence of these vapors, are substantially $CO_2$.

The process may continue in operation indefinitely except for occasional repairs to the converter. Occasionally the fire-brick lining may need replacement. The process, therefore, is continuous, since as the aluminum chloride is produced and the volume of the charge diminished, it is only necessary to charge coke and bauxite at intervals through the bell and hopper. Usually we replenish the charge at a time when about one-third of the converter charge has been consumed. In normal operation it is found that there is substantially no production of ash or other solid residue. Because of the possibility of accurately proportioning the bauxite and carbon, because of the possibility of maintaining temperatures, and because of the possibility of properly proportioning the oxygen and chlorine complete conversion of all oxides into chlorides results. There are no unnecessary diluting gases which have to be heated and which dilute the vapors going to the condenser.

What we claim is:—

1. The process of making aluminum chloride which comprises passing chlorine and oxygen into and through a pervious charge of alumina and carbon at a temperature sufficient to form vapors of aluminum chloride and condensing the aluminum chloride vapors formed.

2. In the manufacture of technical aluminum chloride from ores containing alumina together with other oxides, the process which comprises passing chlorine and oxygen into and through a pervious charge of such an ore in the presence of carbon at a temperature sufficient to convert all oxides present into chlorides in the form of vapors and condensing aluminum chloride from the produced vapors while allowing more volatile chlorides to pass forward.

3. In the manufacture of aluminum chloride from bauxite and other ores of aluminum containing oxides of iron, silicon, titanium, etc., the process which comprises passing chlorine and oxygen into and through a pervious charge of such an ore in a heated condition and in the presence of carbon, the amount of carbon being sufficient to react with substantially all of the alumina present in said ore to form CO and the amount of oxygen being not substantially less than that required to convert such CO into $CO_2$.

4. In the manufacture of technical aluminum chloride from bauxite containing small amounts of silica and iron oxide, the process which comprises passing chlorine and oxygen into and through a pervious charge of bauxite in a heated condition and in the presence of carbon at temperatures sufficient to form vapors of chlorides of aluminum, iron and silicon, and condensing the vapors of aluminum chloride and iron chloride together while allowing silicon chloride to go on uncondensed.

5. The process of making aluminum chloride which comprises passing chlorine and a gas containing at least 75 per cent oxygen upward through a pervious charge of alumina and carbon maintained in a reaction chamber at a temperature sufficient to form vapors of aluminum chloride, withdrawing the gases and vapors from the upper portion of the chamber, and condensing the aluminum chloride vapors thereby withdrawn.

6. The process of making aluminum chloride which comprises continuously passing a gas comprising essentially chlorine and oxygen into and through a pervious bed of coke containing alumina at a temperature sufficient to form vapors of aluminum chloride and recovering the aluminum chloride from the vapors formed.

7. The process of making aluminum chloride which comprises continuously passing a gas comprising essentially chlorine and oxygen into and through a pervious bed of coke containing alumina, maintaining the temperature, by adjusting the chlorine-oxygen ratio, at a point sufficiently high to form vapors of aluminum chloride, and recovering the aluminum chloride from the vapors formed.

8. The process of making aluminum chloride which comprises passing a gas comprising essentially chlorine and oxygen in the approximate ratio of 2:1 and through a pervious bed of alumina and carbon at a temperature sufficient to form vapors of aluminum chloride and recovering aluminum chloride from the vapors formed.

9. The process of making aluminum chloride which comprises continuously passing a gas comprising essentially chlorine and oxygen into and through a pervious bed of alumina and carbon heated to a temperature sufficient to form vapors of aluminum chloride, the amount of carbon being sufficient to react with substantially all of the alumina present to form CO and the amount of oxygen being not substantially less than that required to convert such CO into $CO_2$.

10. The method of chlorinating coke containing alumina comprising introducing a coke containing alumina into a reaction chamber, maintaining a bed of said coke in said reaction chamber, continuously introducing gases containing chlorine and oxygen sufficient to maintain reaction temperature in said reaction chamber, passing said gases through the bed of coke in said chamber, continuously discharging gases and vaporized products of reaction from the upper portion of said chamber, discharging ash and spent coke from the bottom portion of said reaction chamber, and continuously removing condensible products from the gases and vaporized products of reaction.

ALMER McDUFFIE McAFEE.
JOSEPH A. TRYON.